W. E. SMITH.
CATNIP BALL.
APPLICATION FILED AUG. 20, 1908.
1,022,112.
Patented Apr. 2, 1912.
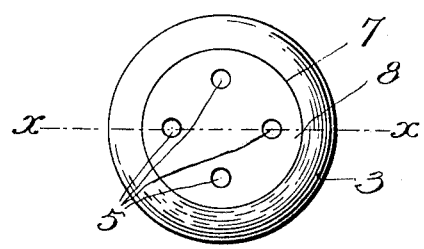
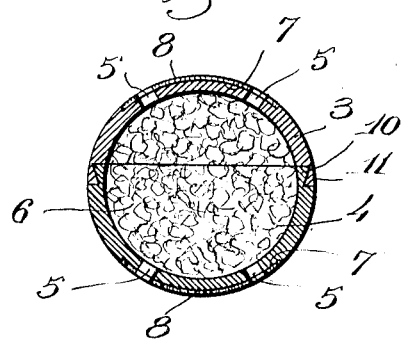
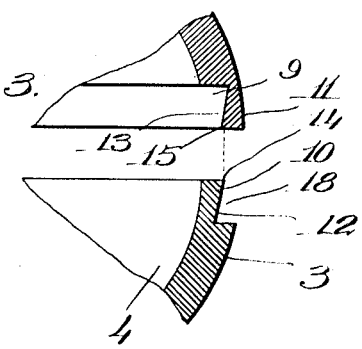
Witnesses.
Thomas J. Drummond
Joseph W. Ward.
Inventor.
Walter E. Smith,
by Crosby Gregory
Att'ys.

UNITED STATES PATENT OFFICE.

WALTER E. SMITH, OF BOSTON, MASSACHUSETTS, ASSIGNOR TO CHARLES C. ROGERS, OF WINCHESTER, MASSACHUSETTS.

CATNIP-BALL.

1,022,112.  Specification of Letters Patent.  Patented Apr. 2, 1912.

Application filed August 20, 1908. Serial No. 449,415.

*To all whom it may concern:*

Be it known that I, WALTER E. SMITH, a citizen of the United States, residing at Boston, county of Suffolk, and State of Massachusetts, have invented an Improvement in Catnip-Balls, of which the following description, in connection with the accompanying drawing, is a specification, like letters on the drawing representing like parts.

This invention relates to catnip balls such as are shown in my Patent No. 848,136, dated March 26, 1907, and which comprise a chambered perforated body adapted to receive a filling of catnip. The catnip ball shown in said patent has a smooth, hard exterior surface. I have noticed many cats attempting to pick up the catnip ball with their paws when playing with it in the attempt to throw it in the air but a catnip ball such as shown in my said patent in which the entire exterior surface is hard and smooth does not lend itself readily to this sort of treatment.

One of the objects of my present invention is to provide a catnip ball which has such a construction that the cat can readily pick it up in its paws and toss it in the air, and otherwise play with it; and another object of the invention is to provide a novel catnip ball which has less weight and is capable of containing a larger amount of catnip than the ball illustrated in my said patent. The first-named object of the invention is secured by making a portion at least of the exterior surface of the catnip ball of some comparatively soft or fibrous material which the cat can readily secure a hold in, and the other object of the invention is secured by the novel manner of making the ball, all as will be more fully hereinafter described and then pointed out in the appended claims.

Referring to the drawings wherein I have illustrated the preferred embodiment of my invention, Figure 1 is a view of the catnip ball; Fig. 2 is a section on the line $x$—$x$, Fig. 1; Fig. 3 is a fragmentary view on an enlarged scale showing the manner in which the two parts of the ball are put together.

The catnip ball comprises a hollow or chambered body 3 within the chamber 4 of which is placed catnip 6 or some similar material, the odor of which is attractive to cats. The body 3 is preferably spherical in shape so that it will roll on the floor, although this is not essential to the invention, and said body may have other shapes without departing from the invention. The body is also provided with a plurality of apertures 5 leading into the chamber 4 through which the odor of the catnip escapes. In order to provide a catnip ball which the cat can readily pick up I propose to make a part at least of the exterior surface of the ball of some material in which the cat can readily secure a hold, and where the ball is made of wood or some similar material which has a comparatively hard smooth surface, I secure this end by applying to the ball in such a way as to cover a part at least of the surface thereof some soft or easily penetrable material which the cat may readily take hold of with its claws. While it is within my invention to apply this soft material in a variety of ways, I prefer to form in the side of the ball one or more recesses 7 into which a piece 8 of soft or fibrous material is inserted. These recesses 7 may conveniently be made circular in shape, as shown in Fig. 1, in which case the soft or fibrous material will be cut in the form of disks and of a thickness equal to the depth of the recess. This disk of soft material may be retained in the recess in any suitable way as by gluing or cementing it in place.

The apertures 5 may be made in the ball in any position, although in the drawing they are shown as extending through that portion of the body of the ball which has the soft covering thereon.

The advantage of making the apertures through the portion of the shell of the ball which has the disks 8 of felt or other soft material thereon is that the fibers of the material 8 will naturally extend into the aperture 5 somewhat thereby acting to prevent any small particles of catnip from being discharged. This is especially true if the holes 5 are made with an ordinary drill after the disks 8 are put in place, for the operation of such a drill will not cut a clean hole through the disk but will leave the edge of the hole more or less ragged. Any desired portion of the surface of the ball may be covered by such soft material, but I have found that by placing two pieces or disks 8 of soft material on diametrically opposite sides of the ball answers all ordinary purposes, and I prefer to make the ball in this way. The number of these disks of soft material which are applied to the ball is not essential to the invention, however.

It is within my invention to use any material for the disks 8 which is of such a character that the cat can readily catch hold of it. I prefer, however, some fibrous material, and I have found from experiment that a piece of felt answers all requirements, although it is not essential to the invention that felt be used.

The ball is preferably made in two parts, each being concavo-convex in shape, thus forming a substantially spherical cavity or chamber 4. The two halves of the ball may be held together in any appropriate way and might be made to screw together without departing from the invention. I prefer however, the construction herein shown because it permits the two parts of the ball to be readily attached to each other by a simple movement toward each other. One of the halves of the ball is rabbeted externally, as at 18, to form an internal lip 10, and the other half is rabbeted internally, as at 9, to form an external lip 11. The walls 12 and 13 of the two lips are preferably inclined in such a way as to make the outer end of the lip 10 of slightly larger diameter than the inner end thereof, and to make the inner end of the rabbeted portion 9 of slightly larger diameter than the outer end thereof. In fact in actual construction the outer corner 14 of the lip 10 is slightly larger in diameter than the inner corner 15 of the lip 13, so that when the two parts of the ball are forced together, the lips will spring slightly to permit the parts to be united. With this construction the two parts are securely held together and will not become disconnected from each other while the catnip ball is in use. The two parts of the ball can, however, be readily pulled apart in case it is desired to replenish the supply of catnip within the ball.

I would have it understood that I have only illustrated and described the preferred form of my invention and that, therefore, many changes in the construction may be adopted without departing from the invention.

Having described my invention, what I claim as new and desire to secure by Letters Patent is:—

1. A catnip ball comprising a chambered body having a cavity to contain catnip, and also having a recess on its exterior surface, and a piece of soft fibrous material filling said recess and coming flush with the exterior of the ball, the recessed portion of the ball and said fibrous material being provided with perforations leading to the cavity, and the fibers of said fibrous material partially filling the aperture therethrough and thereby preventing the catnip from sifting through the apertures of the body.

2. In a catnip ball, the combination with a body provided with an interior cavity adapted to contain catnip, and also having a circular recess of uniform depth on its exterior surface, said recessed portion of the body being provided with apertures, of a piece of felt set into said recess and having a thickness equal to the depth thereof, said felt being provided with apertures which are alined with those of the body but which are partially closed by the projecting fibers, whereby the catnip material is prevented from sifting through the apertures.

3. A catnip ball comprising a body adapted to roll and formed of two concavo-convex halves, each having an annular rabbet and an annular slightly undercut lip, the lip of each part fitting into the rabbet of the other part, each part having an exterior recess, and a piece of soft, fibrous material filling each recess, the recessed portions and the fibrous material being perforated to emit a catnip odor.

In testimony whereof, I have signed my name to this specification, in the presence of two subscribing witnesses.

WALTER E. SMITH.

Witnesses:
 Louis C. Smith,
 Frederick S. Greenleaf.